United States Patent [19]

Ohta et al.

[11] Patent Number: 5,453,975
[45] Date of Patent: Sep. 26, 1995

[54] OPTICAL DISC WITH SURFACE COATING AND MANUFACTURING METHOD THEREFOR

[75] Inventors: Kenji Ohta; Tetsuya Inui; Toshikazu Nagaura, all of Nara, Japan

[73] Assignee: Sharp Kabushiki Kaisha, Osaka, Japan

[21] Appl. No.: 259,566

[22] Filed: Jun. 14, 1994

Related U.S. Application Data

[63] Continuation-in-part of Ser. No. 990,576, Dec. 16, 1992, abandoned.

[30] Foreign Application Priority Data

Dec. 16, 1991 [JP] Japan ..................................... 3-331805

[51] Int. Cl.⁶ ..................................................... G11B 7/24
[52] U.S. Cl. .......................... 369/275.1; 369/275.5; 369/283; 430/271; 430/523; 430/935
[58] Field of Search ............................. 369/275.1, 283, 369/291, 275.5, 284, 288; 430/523, 945, 935, 495, 270, 271; 428/64, 412, 447, 589, 220, 216, 913

[56] References Cited

U.S. PATENT DOCUMENTS

| | | | |
|---|---|---|---|
| 4,734,319 | 3/1988 | Doi | 428/216 |
| 4,758,464 | 7/1988 | Masuzana et al. | 428/220 |
| 4,877,667 | 10/1989 | Hattori et al. | 430/945 |
| 5,006,058 | 4/1991 | Maruyama et al. | 425/556 |
| 5,020,048 | 5/1991 | Arai et al. | 369/283 |
| 5,119,363 | 6/1992 | Satoh et al. | 369/275.3 |
| 5,176,943 | 1/1993 | Woo | 428/64 |
| 5,202,171 | 4/1993 | Anezaki et al. | 369/288 |
| 5,202,220 | 4/1993 | Park et al. | 369/283 |

FOREIGN PATENT DOCUMENTS

| | | |
|---|---|---|
| 0443522 | 8/1991 | European Pat. Off. . |
| 8815125 | 12/1988 | Germany . |
| 01-158643 | 6/1989 | Japan . |
| 1119934 | 8/1989 | Japan . |
| 21235334 | 7/1990 | Japan . |
| 3176832 | 10/1991 | Japan . |
| 3273537 | 12/1991 | Japan . |

*Primary Examiner*—Scott J. Sugarman
*Assistant Examiner*—Kim-Kwok Chu
*Attorney, Agent, or Firm*—David G. Conlin; Milton Oliver

[57] ABSTRACT

An optical disc includes a recording film formed on one surface of a disc-shaped plastics substrate having light transmission properties, and a coating film formed on the other surface of the substrate to which an optical beam is applied, in which the plastics substrate is made by injection molding and a barrier, such as a U-shaped annular groove or ridge, is circumferentially formed on the other surface, at a radial distance which is the distance from a center position to a joint position of an injection mold, and a method for manufacturing the same.

15 Claims, 2 Drawing Sheets

5,453,975

OPTICAL DISC WITH SURFACE COATING AND MANUFACTURING METHOD THEREFOR

This is a continuation-in-part of application Ser. No. 07/990,576 filed on Dec. 16, 1992, now abandoned.

BACKGROUND OF THE INVENTION

1. Field of the Invention

The present invention relates to an optical memory element for recording, reproducing, erasing information using a laser beam and its manufacturing method, and more particularly, to an optical disc having favorable antistatic properties or resistance to marring and its manufacturing method.

2. Description of the Related Art

Recently, research and development is briskly underway for an optical memory element with a high recording density and a large capacity. A glass and transparent resins are suitable for substrates of the optical memory element. In particular, polycarbonate is preferably suitable among the resins, because it has a good productivity and moisture resistance.

However, dust easily sticks to polycarbonate substrates because they are easily electrically charged owing to their high surface resistivity of $10^{16}$ Ω. In an optical disc memory, a beam is focused on a recording film in the order of μ m through the transparent substrates of approximately 1.2 mm thickness made of glass or transparent resins. Therefore, generally the focused beam may not be possibly affected by the dust on the transparent substrate. But in actual case, the dust causes a problem on recording and erasing of a magneto-optical disc, though it does a little on playback of a Compact Disc-as mentioned above. It is because recording and erasing consumes a lot of energy as compared with playing back, and the dust scatters the beam on the substrate surface, which causes a recording or/and erasing error as a result of energy power shortage.

In order to prevent the beam from scattering as shown FIG. 6, a proposal is made to cover an optical disc with an antistatic layer 42 where a metal oxide is dispersed as electro-conductive filler in acrylic resin layer (Japanese Unexamined Patent Application No. 158643/1989). In addition, a recording layer 44 is formed on a back surface of the polycarbonate substrate 41.

But FIG. 6 is a schematic view showing the optical disc. In actual case, both surfaces of the polycarbonate substrate 41 are not even as shown in FIG. 7. More specifically, an annular ridge 48 and a groove 46 are formed at an inner circumference on the front and back surfaces of the polycarbonate substrate 41, respectively corresponding to a gap or a swelling in a joint between parts of a mold for injection machine. In addition, a height of the ridge 48 and a depth of the groove 46 are not uniform in the circumferential direction. A centering part 45 called a center hub is bonded on an inner hole 43 of the optical disc. The ridge 48 and the groove 46 are formed in the vicinity of outer circumference of the centering part 45.

An antistatic layer is spin-coated on the surface of the polycarbonate substrate 41. A density of the antistatic layer changes in the circumferential direction corresponding to a distribution of ridge height 48 or the groove depth 46. As a result, the antistatic layer changes in thickness in the circumferential direction, resulting in a shift in the focused optical beam offset, disturbance of a servo signal for recording, reproducing and erasing, and decrease in the power of the optical beam.

When an antistatic layer 49 is formed outside the ridge 48 as shown in FIG. 7 in order to prevent wide distribution of the film thickness of the antistatic layer, dust is gathered at an exposed portion 47 free of the antistatic layer 49. Although the exposed portion 47 serves as a reference surface when the optical disc is mounted on a drive apparatus, the reference surface cannot be provided or the polycarbonate substrate 41 is damaged if the dust exists on the exposed portion 47.

In addition, the centering part 45 and the polycarbonate substrate 41 are formed of the same material so that their adhesive state will not suffer from a different expansion nor shrinkage by heat. More specifically, the centering part 45 is also formed of polycarbonate. Since an antistatic means is not taken in the prior art, the dust also sticks to the centering part 45. As a result, the dust is piled together on the surface of the optical disc owing to peeling from centering part 45 by a vibration of the disc or the like and tends to disturb the servo signal and decrease the power of the optical beam.

SUMMARY OF THE INVENTION

The present invention provides an optical disc comprising a magneto-optical recording film and a protective film formed in this order on one surface of a disc-shaped plastics substrate of light-transmissive properties and a coating film formed on the other surface to which an optical beam is applied, and its manufacturing method.

The plastics substrate may be formed by injection molding and a groove or ridge is formed on the whole circumference a radius of which is a distance between the center and a joint position of an injection mold.

The coating films may be various kinds of films such as an antistatic film, a hard coating film or the like which are known in the art. Among these, the antistatic film and the hard coating film are preferable.

Preferably, the antistatic film is formed of a synthetic resin to which tin oxide doped with phosphorous is added as an electro-conductive filler.

In addition, according to a manufacturing method for an optical disc having the U-shaped groove, a liquid synthetic resin is coated to an outer circumference of the groove on the substrate surface under rotating and then it is also coated to an inner circumference of the groove under further rotating, in which a rotational speed during the coating onto the outer circumference is preferred to be higher than that during the coating onto the inner circumference.

DETAILED DESCRIPTION OF THE INVENTION

Figure 1:
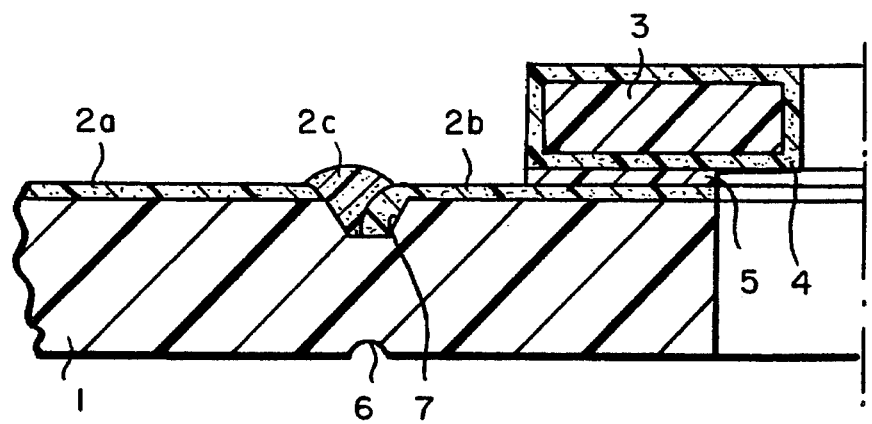
FIG. 1 is a vertical sectional view showing a main portion of an optical disc according to the present invention.

An optical disc according to the present invention may be any of a magneto-optical disc, a compact disc, a write once type disc and a photochromic type disc which are all well known.

An recording film, a protective film, a moisture resistance film for preventing moisture transmission, and a coating film formed on the optical disc will be described hereinafter.

A plastics substrate having light transmission properties according to the present invention is formed by normal injection molding. A material of the substrate may be plastics which has light transmission properties and is not likely to be distorted. Typically, polycarbonate is suitable. Another material such as acrylic resin or epoxy resin may be also suitable for the substrate. A thickness of the substrate is normally 1.15 to 1.25 mm.

Since the plastics substrate is formed by the injection molding, a joint between parts of a mold is generated. Although a position of the joint varies with a design of the mold, normally it is between 1/10 and 4/5 of the radius of the substrate. A U-shaped groove or ridge is formed in whole circumference corresponding to the position of the joint. The groove or the ridge may be formed by using the mold which previously installs it on a predetermined position, or may be shaped on the joint position of the plastics substrate after the injection. In a case of the groove, the joint is positioned in the middle the groove. A dimension of the groove in cross section is preferably as follows. That is, a width of an opening is approximately 1.5 to 2.5 mm, a width of bottom is approximately 0.7 to 1.3 mm and a depth is approximately 0.1 to 0.2 mm. Meanwhile, a dimension of the ridge in cross section is preferably as follows. That is, a width of bottom is approximately 1.5 to 2.0 mm, width of top is approximately 0.7 to 1.3 mm, and a height is approximately 0.3 to 0.7 mm.

The recording film is formed on one surface of the plastics substrate by spin coating, roll coating, sputtering, or other coating methods. The structure of the recording film is well-known in the prior art. Typically, there are a four-layer structure such as AlN/GdTbFe/AlN/Al or AlN/DyFeCo/AlN/Al or a three-layer structure such as SiN/TbFeCo/SiN or SiAlON/TbFeCo/SiAlON. The film thickness thereof is normally 150 to 300 nm. Although the recording film is formed on the whole surface of the plastics substrate, it may be formed partially thereon.

In addition, the recording film serves as not only the magneto-optical medium but also a medium of read only, write once, phase transition or photochromic.

The protective film is formed on the recording film by spin coating, roll coating, or other coating methods. The protective film mainly protects the recording film, which may be formed of acrylic urethane UV curing resin, polyvinylidene chloride resin, poly-trifluoride ethylene chloride resin or the like. The film is formed by coating those. Its film thickness is normally 2 to 20 μm.

In addition, the moisture resistance film is optionally formed on the other surface of the plastics substrate to which the optical beam is applied by spin coating, roll coating, vapor deposition, sputtering or the like. The moisture resistance film may be formed of an inorganic material such as AlN, SiN, ZnS, $Al_2O_3$, $SiO_2$, SiAlON or an organic material such as polyvinylidene chloride resin or poly-trifluoride ethylene chloride resin. Among them, AlN is especially preferable. A thickness of that film varies with the material. Generally, the thickness of the film formed of the inorganic material ranges from 1 to 300 nm, preferably 1 to 200 nm. Alternatively, the thickness of the film formed of the organic material ranges from 2 to 20 μm, preferably 2 to 15 μm. For example, in a case of AlN, it preferably ranges from 1 to 20 nm. Within the above range of the film thickness, transient warp on change in humidity can be prevented and also an interference band of the optical disc can be prevented.

In addition, the coating film is formed on the other surface of the substrate or on the moisture resistance film optionally formed on the other surface to which the optional beam is applied.

The coating film is formed by coating onto the substrate by, for example spin coating, curing by means such as UV ray irradiation, heating and cooling.

When the antistatic film is used as the coating film, the antistatic resin film mixed with the electro-conductive filler, surfactant or the like can be formed by mixing a synthetic resin or its raw material with the transparent electro-conductive filler in a predetermined ratio and, if necessary, adding an inorganic filler a little to improve the hardness, and coating them onto the substrate. As the synthetic resin, for example, acrylic urethane UV curing resin, acrylic UV curing resin or the like is suitable.

The method of forming film may be varied according to the synthetic resin employed. In a case where the U-shaped groove is provided in the substrate, a liquid synthetic resin is coated to the outer circumference of the groove on the substrate surface by rotation, then coated to the inner circumference of the groove on the substrate surface by further rotation, and finally the groove is filled up to be nearly even. It is preferable that the rotational speed while the liquid synthetic resin is coated to the outer circumference is approximately 2,000 to 4,000 rpm, the rotational speed while it is coated to the inner circumference is approximately 300 to 800 rpm and the rotational speed while the groove is filled up is approximately 20 to 80 rpm. At this time, the rotational speed during the coating onto the inner circumference has to be lower than that during the coating onto the outer circumference. If the rotational speed during the coating onto the outer circumference is higher than that during the coating onto the outer circumference, the liquid synthetic resin for the inner circumference overflows to the outer circumference beyond the groove, which causes to take place a bad influence on uniformity of the antistatic film thickness.

The film thickness is preferably 1 to 20 μm. The antistatic resin film contains a transparent electroconductive filler and prevents the dust from being attached onto the surface of the optical disc and also prevents a damage from being generated, and it is preferable that its film surface has high hardness and relatively low surface resistance. The hardness is preferably HB or more in pencil hardness. In addition, the surface resistivity is preferably approximately $10^{13}$ Ω or less.

The transparent electro-conductive filler preferably comprises tin oxide doped with phosphorus because light transmission properties and stability can be provided at the same time. In addition, doping of phosphorous, such as phosphoric acid or sodium phosphate, to the tin oxide is performed by corecipitation and sintering from a liquid phase. A doping amount into the tin oxide is preferably 3 to 7 wt% of the whole amount of the electro-conductive filler. If the doping amount is less than 3 wt%, the electro-conductivity becomes poor and its stability becomes also poor. It is preferable that the content of the electroconductive filler in the antistatic film is about 25 to 45 wt% and the average particle diameter of the filler is 0.15 μm or less. If the content of the filler is less than 25 wt%, the surface resistivity exceeds $10^{13}$ Ω, so that enough antistatic performance can not be obtained. If the content of the filler exceeds 45 wt% or the average particle diameter is larger than 0.15 μm, surface roughness of the film is increased and then the light transmission properties become poor.

When the hard coating film is used as the coating film, the hard coating film may be formed by the same method by which the antistatic film is formed. The thickness of the hard coating film is preferably 2–15 μm. The hard coating film has a favorable resistance to marring owing to its high hardness. For example, when dust which sticks to the surface of the film is wiped off with a cloth or the like, no scars are left on the surface. Even if the disc covered with such hard coating is repetitively mounted on a disc driving apparatus, no scratches are left on the reference surface thereof. The hardness of the film may be compared to the HB or more in the pencil hardness.

The optical disc according to the present invention is typically a magneto-optical disc, but may be a compact disc, a write once type disc and a photochromic type disc using a photochromic material as the recording film.

EMBODIMENT

Embodiment 1

An embodiment of the present invention will be described in reference to FIGS. 1 and 2.

Reference numeral 1 designates a substrate formed of polycarbonate, 2a an outer circumferential portion of an antistatic film, 2b an inner circumferential portion of the antistatic film, 2c the antistatic film formed on the groove, 3 a positioning part, 4 another antistatic film, 5 an adhesion layer, 6 a small groove generated by a joint on the other surface of the polycarbonate substrate, 7 a U-shaped groove on one surface of the polycarbonate substrate according to the present invention, and 8 a ridge generated by the joint on one surface of the polycarbonate substrate.

Figure 2:
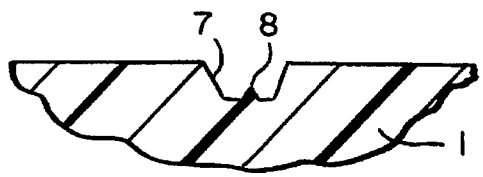
FIG. 2 is an expanded vertical sectional view showing a part of the optical disc shown in FIG. 1.

As shown in FIG. 1, the antistatic layers 2a to 2c are formed on one surface of the polycarbonate substrate 1 onto which a laser beam is applied for recording, reproducing and erasing, and a recording layer (not shown) is formed on the other side of the substrate. The small groove 6 and the U-shaped groove 7 are formed on the back surface and on the front surface of the polycarbonate substrate 1, respectively at a position corresponding to the joint between parts of the mold used for injection of the polycarbonate substrate 1. A width of an opening of the groove 7 is approximately 2 mm, a width of a bottom thereof is approximately 1 mm, and a depth thereof is approximately 0.1 to 0.2 mm. In addition, the small ridge 8 is formed by the joint in the bottom thereof as shown in FIG. 2.

Steps of forming the antistatic layers 2a to 2c will be described hereinafter. First, an antistatic agent is applied outside the groove 7 by spinning to form the antistatic layer 2a. The rotational speed may be set to a high level, for example 3000 rpm in order to form the thin and uniform antistatic layer 2a. In addition, a mixture of the UV curing resin and a filler of tin oxide doped with phosphorus is used as the antistatic agent.

Then, the antistatic agent is coated inside the groove 7 by spinning to form the antistatic layer 2b. Since it is important that the antistatic layer 2b does not overflow beyond the large groove 7 rather than it is uniformly formed, the rotational speed at that time is set low, for example 500 rpm.

Finally, the antistatic agent is coated in the groove 7 at considerably low speed, that is, several tens rpm to form the antistatic layer 2c, whereby the antistatic layer 2a and the antistatic layer 2b are made even by coating the antistatic layer 2c on the groove 7 and then they are electrically conductive. Thus, the groove 7 takes an active part as a barrier of the antistatic agent fluid.

In the above embodiment of the present invention, the antistatic layer 2a has to be coated before the antistatic layer 2b is coated. That is, when the antistatic layer 2b is coated, the antistatic agent sometimes partially overflows beyond the large groove 7. If the antistatic layer 2a is coated onto the overflowed layer, the film thickness of the antistatic layer 2a is not even, which causes a servo-mechanism disturbed.

Then, the center hub 3 of polycarbonate is covered with the antistatic layer 4 as the same material as the antistatic layers 2a to 2c and bonded to the antistatic layer 2b through the electro-conductive adhesion layer 5. As the electro-conductive adhesion layer 5, an electro-conductive adhesive in which tin oxide is mixed in the UV curing resin (ELCOM p3555 made by CATALYSTS & CHEMICALS INDUSTRIES CO., LTD.) is employed.

As described above, since the small ridge 8 is formed in the groove 7 as the result of the joint and the antistatic layers 2a, 2b and 2c are formed in this order, the antistatic layer 2a to which the optical beam for recording, reproducing and erasing is applied can be uniformly formed. Furthermore, since the antistatic layer 2b is formed on a reference surface when the optical disc is attached onto a drive apparatus, the dust is not attached onto the reference surface.

If the antistatic agent is doped with phosphorus, transparency of the antistatic layer is improved and the surface resistivity of the antistatic layer becomes small (approximately $10^{10}$ Ω). Especially, when the UV curing resin is used as the antistatic agent, its transparency is important and doping of phosphorus is effective.

Embodiment 2

Another embodiment of the present invention will be described hereinafter in reference to FIG. 3. Parts having the same functions as in the above embodiment are denoted the same reference numeral as above and its description will be omitted. Reference numeral 9 designates a ridge.

Figure 3:
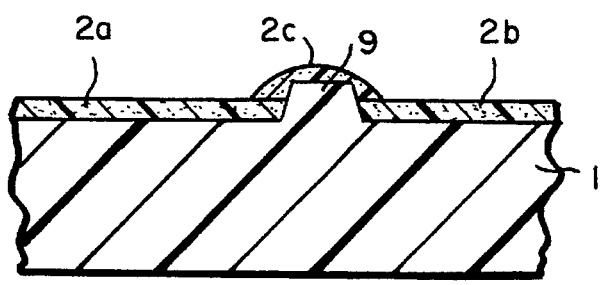
FIG. 3 is a vertical sectional view showing a main portion of another optical disc according to the present invention.

The U-shaped ridge 9 is formed on the surface of the polycarbonate substrate 1 at a part corresponding to the joint of the mold as shown in FIG. 3. A width of the ridge is approximately 1 mm, and a height thereof is approximately 0.5 mm. The antistatic layers 2a, 2b and 2c are coated to the outer and the inner circumference and on the ridge 9, respectively by spinning. Conditions of the above coating is the same as described in the above embodiment 1.

As described above, the ridge 9 serves as a barrier for preventing fluid of the antistatic layer 2b from overflowing toward the antistatic layer 2a when the antistatic layer 2b is coated. Similar to the embodiment 1, the antistatic layers 2a and 2b are electrically conductive through the antistatic layer 2c.

When the surface resistivity of the antistatic layers 2a to 2c according to the present invention is approximately $10^{13}$ Ω, even if the antistatic layer 2c is not provided, which does not affect on their antistatic faculty. However, when the surface resistivity is in the order of $10^{10}$ Ω, if there is not provided the antistatic layer 2c to make electrically conductive passage to the outside through the center hub 3, their antistatic faculty becomes poor.

In order to make electrically conductive passage to the outside, a cartridge for housing the optical disc is formed of the electro-conductive polycarbonate and the antistatic layers 2a to 2c are provided on the optical disc, whereby the whole surface is electro-conductive. Thus, there is no potential difference between the optical disc and the outside when the cartridge is carried.

Although the optical disc normally floats during rotation by the drive unit, the potential difference between the optical disc and the outside is reconciled through the center hub 3.

Furthermore, if an electro-conductive brush is provided within the cartridge in contact with the surface of the optical disc during rotation, the antistatic effect becomes more conspicuous.

In addition, when the antistatic layer 2b is coated by the brush or formed by screen printing process on the inner circumference after the antistatic layer 2a is coated by spinning according to the embodiments 1 and 2, although uniformity of the antistatic layer 2b is not obtained, sufficient characteristics as the antistatic layer according to the present invention can be obtained.

Embodiment 3

Figure 4:
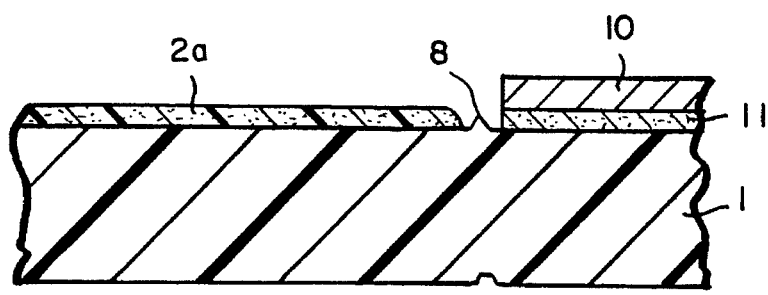
FIG. 4 is a vertical sectional view showing a main portion of another optical disc according to the present invention.
Figure 5:
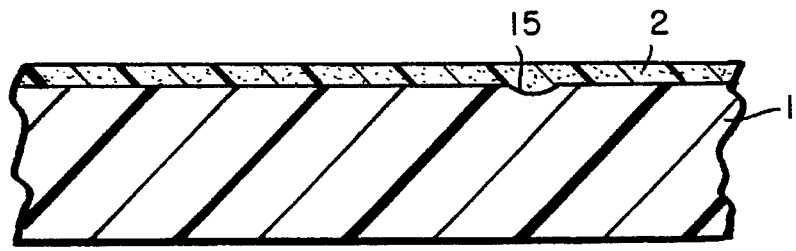
FIG. 5 is a vertical sectional view showing a main portion of still another optical disc according to the present invention.
Figure 6:
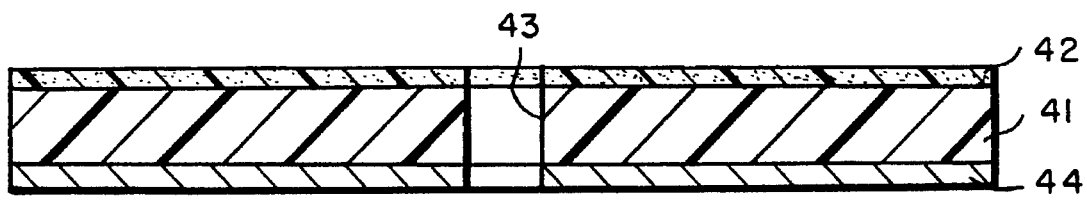
FIG. 6 is a schematic vertical sectional view showing a conventional optical disc.
Figure 7:
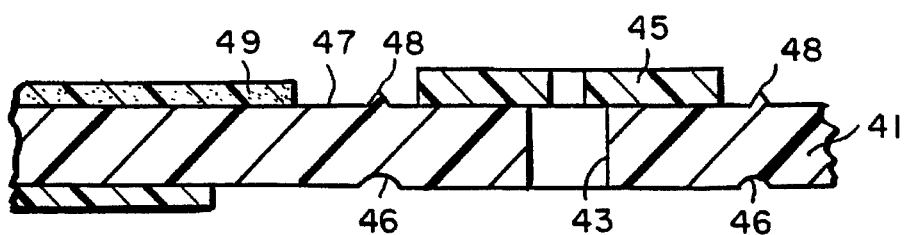
FIG. 7 is a vertical sectional view showing a main portion of the conventional optical disc.

According to this embodiment of the present invention, an elector-conductive film is employed instead of the antistatic layer used in the above embodiments 1 and 2. FIGS. 4 and 5 show an example. The same reference numeral as the above is not described here. Reference numeral 10 designates an electro-conductive film, 11 an electro-conductive adhesion layer, and 15 a part corresponding to the joint between parts of the mold. As shown in FIG. 4, instead of the antistatic layer 2b, the electro-conductive film 10 may be adhered to a region inside the small ridge 8 through the electro-conductive adhesion layer 11. The electro-conductive film 10 is formed of an ITO (oxide of indium and tin whose thickness is approximately 0.07 μm) on a polyester film (whose thickness is approximately 50 μm). As the electro-conductive adhesion layer 11, the electro-conductive adhesive, which is the same as the electro-conductive adhesive used in the embodiment 1, in which tin oxide is mixed with a UV curing resin (ELCOM p3555 made by CATALYSTS & CHEMICALS INDUSTRIES CO., LTD.) is used.

The center hub 3 at the inner circumference of the optical disc according to the embodiments 1 to 3 may be formed by injecting a polycarbonate resin in which a cationic antistatic agent is mixed. In this case, if the ridge is provided on an adhesive surface of the center hub 3 and the center hub 3 is welded to the optical disc by supersonic wave, the electro-conductive adhesion layer 5 may be omitted.

Since the small ridge 8 shown in FIG. 4 is so small, the part 15 corresponding to the joint can be made almost even by only rubbing it with alumina of 0.5 μm several times as shown in FIG. 5. Then, the antistatic agent is applied from the inner circumference by spinning. Thus, the uniformed antistatic layer is formed.

Embodiment 4

In this particular embodiment, a similar effect is produced by using an antistatic agent containing a surfactant in place of an antistatic agent containing electroconductive filler used in Embodiments 1 and 2. Even when an antistatic agent UR-4501 of acrylic UV curing type (manufactured by Mitsubishi Rayon Co., Ltd.) is used, an overall uniform antistatic film can be formed which has a surface resistivity of $10^{13}$ Ω.

Embodiment 5

The structure of the present invention can be applied to a case in which a surface coating other than the antistatic agent is used. In this particular embodiment, a hard coating is used in place of the antistatic agent used in Embodiments 1 and 2. Although hard coatings of various kinds can be applied, UR-4502 coating agent of acrylic UV curing type (manufactured by Mitsubishi Rayon Co., Ltd.) is used.

Steps for forming the hard coating in this embodiment is the same as Embodiments 1 and 2. The first step is to apply an coating agent with a spinner to a region outside of the recessed portion shown in Embodiment 1 and the ridge (a barrier for preventing a fluid overflow) shown in Embodiment 2. When the spinner rotates at a speed of 2000 to 3000 rpm in the application of the coating agent, the coating agent can be thinly and uniformly applied to the region without causing any problem. The second step is to apply the coating agent with the spinner to a region inside of the barrier for preventing the fluid overflow. When the rotational speed of the spinner is set to about 100 rpm at the application of the coating agent, the coating agent does not overflow to a region outside of the barrier for preventing the fluid overflow.

In accordance with this embodiment, a hard coating having a favorable resistance to marring can be uniformly formed on the overall surface of the disc. In particular, the coating agent applied to the inside of the barrier for preventing the fluid overflow does not overflow to the outside owing to the fluid overflow prevention effect described above. Thus coating can be formed uniformly on the recording effective portion on the surface of the disc. This prevents the generation of a disorder in servo mechanism and an energy power shortage in a recording region resulting from a non-uniformity in coating. Furthermore, in accordance with this embodiment, the hard coating having a favorable resistance to marring is formed on the overall surface of the disc. Even when dust that sticks to the surface of the disc is wiped off with a cloth or the like, no scratches and scars are left thereon. The hard coating formed on the polycarbonate substrate has a hardness which can be compared to HB for pencil hardness when measured in accordance with JIS-K5400. (The hardness of polycarbonate substrate itself shows 4B–6B when measured with JIS-K5400). The hard coating is also formed on the reference surface (inside of the barrier for which preventing the fluid overflow) for mounting the optical disc on a disc driving apparatus. Consequently, even when the disc is repetitively mounted on the disc driving apparatus, no scars are left on the reference surface.

As described above, according to the optical disc of the invention, an groove is formed at the position on the plastics substrate corresponding to the joint so as to take an active part as a barrier of a liquid material fluid coated to the plastics substrate.

Therefore, since the surface of the plastics substrate is separated to an outer circumferential region and an inner circumferential region by the groove or ridge, the liquid material can be coated to each region without being affected by the joint between parts of a mold for injection. In addition, since the groove takes an active part as a barrier of the liquid material fluid when the liquid material is coated to the inner circumferential region by, for example spin coating, the liquid material coated to the inner circumferential region is prevented from overflowing to the outer circumferential region.

Furthermore, when the antistatic film is used, dust is prevented from being attached onto the surface of the positioning part, whereby recording and reproducing reliability of the optical disc can be improved. When the hard coating film is used, the resistance to marring is good, which prevents a damage from being generated on the surface of the optical disc. Still further, transparency of the antistatic layer can be improved by doping the tin oxide filler with phosphorus.

While only certain presently preferred embodiments have been described in detail, as will be apparent with those skilled in the art, certain changes and modifications can be made without departing from the scope of the invention as defined by the following claims.

What is claimed is:

1. An optical disc, comprising
   a recording film formed on a first one of two major surfaces of a disc-shaped plastic substrate having light-transmissive properties, and
   a coating film formed on a second surface of said substrate, to which second surface an optical beam is applied, in which the plastic substrate is made by injection molding and
   a barrier is circumferentially formed on said second surface at a radial distance which is the distance from a center position to a joint position of an injection mold.

2. An optical disc, comprising
   a recording film formed on a first one of two major surfaces of a disc-shaped plastic substrate having light-transmissive properties, and
   an antistatic film formed on a second surface of said substrate, to which second surface an optical beam is applied, in which the plastic substrate is made by injection molding and
   a barrier is circumferentially formed on said second surface at a radial distance which is the distance from a center position to a joint position of an injection mold, said antistatic film covering the barrier.

3. An optical disc according to claim 1 or 2 wherein said barrier is a groove in which an opening width of the groove is 1.5 to 2.5 mm, a bottom width thereof is 0.7 to 1.3 mm and a depth thereof is 0.1 to 0.2 mm.

4. An optical disc according to claim 1 or 2 wherein said barrier is a ridge in which a bottom width of the ridge is 1.5 to 2.0 mm, a top width thereof is 0.7 to 1.3 mm and a height thereof is 0.3 to 0.7 mm.

5. A method for manufacturing an optical disc in which a recording film is formed on one surface of a disc-shaped plastics substrate of light transmission properties, and an antistatic film is formed and coated by a liquid synthetic resin added with an electro-conductive filler to the other surface thereof to which an optical beam is applied, comprising the steps of
   forming the plastics substrate by injection molding;
   forming a circumferential barrier on the other surface at a radial distance which is the distance from the center position to a joint position of an injection mold; and
   coating the liquid synthetic resin to the outer circumference of the barrier on said other surface by rotation, and then coating the liquid synthetic resin on to the inner circumference of the barrier on the substrate surface by further rotation, in which a rotational speed during coating on the inner circumference is lower than that during coating onto the outer circumference.

6. A method for manufacturing an optical disc according to claim 5, wherein the rotational speed during the coating onto the inner circumference is 300 to 800 rpm and the rotational speed during the coating onto the other circumference is 2000 to 4000 rpm.

7. A method for manufacturing an optical disc according to claim 6, wherein the rotational speed during the coating onto the inner circumference is 300 to 800 rpm and the rotational speed during the coating onto the other circumference is 2000 to 4000 rpm.

8. A method for manufacturing an optical disc in which a recording film is formed on one surface of a disc-shaped plastic substrate of light transmission properties, and an antistatic film is formed and coated by a liquid synthetic resin added with an electro-conductive filler to the other surface thereof to which an optical beam is applied, comprising the steps of
   forming the plastic substrate by injection molding;
   forming a circumferential barrier on the other surface at a radial distance which is the distance from the center position to a joint position of an injection mold; and
   coating the liquid synthetic resin to the outer circumference of the barrier on said other surface by rotation, and then coating the liquid synthetic resin on to the inner circumference of the barrier on the substrate surface by further rotation, in which a rotational speed during coating on the inner circumference is lower than that during coating onto the outer circumference.

9. A method for manufacturing an optical disc according to claim 6 or 8 wherein said barrier is formed as a groove in which an opening width of the groove is 1.5 to 2.5 mm, a bottom width thereof is 0.7 to 1.3 mm and a depth thereof is 0.1 to 0.2 mm.

10. A method for manufacturing an optical disc according to claim 6 or 8 wherein said barrier is formed as a ridge in which a bottom width of the ridge is 1.5 to 2.0 mm, a top width thereof is 0.7 to 1.3 mm and a height is 0.3 to 0.7 mm.

11. A method of manufacturing an optical disc, in which:
    a recording film is formed on a first one of two major surfaces of a disc-shaped plastic substrate having light-transmissive properties, and
    a coating film is formed on a second surface thereof, to which said second surface an optical beam is applied,
    comprising the steps of:
    forming the plastic substrate by injection molding, including simultaneously forming a circumferential barrier on the second surface at a radial distance which is the distance from a center position of said disc to a joint position of an injection mold; and
    coating a liquid synthetic resin, during rotation of said disc, onto that portion of said second surface radially outside said circumferential barrier, and
    coating said liquid synthetic resin, during rotation of said disc, onto that portion of said second surface radially inside said circumferential barrier,
    rotational speed during coating onto said radially inside portion being lower than rotational speed during coating onto said radially outside portion.

12. A method of manufacturing an optical disc according to claim 11, wherein
    rotational speed during said coating onto said radially inside portion is 300 to 800 rpm, and rotational speed during said coating onto said radially outside portion is 2000 to 4000 rpm.

13. A method of manufacturing an optical disc, in which:

a recording film is formed on a first one of two major surfaces of a disc-shaped plastic substrate having light-transmissive properties, and an antistatic film, containing a liquid synthetic resin with an electro-conductive filler added thereto, is formed and coated onto a second surface of said substrate, to which said second surface an optical beam is applied, comprising the steps of:

forming the plastic substrate by injection molding, including simultaneously forming a circumferential barrier on the second surface at a radial distance which is the distance from a center position of said disc to a joint position of an injection mold; and coating said antistatic film, during rotation of said disc, onto that portion of said second surface radially outside said circumferential barrier, and coating said antistatic film, during rotation of said disc, onto that portion of said second surface radially inside said circumferential barrier, rotational speed during coating onto said radially inside portion being lower than rotational speed during coating onto said radially outside portion.

14. A method of manufacturing an optical disc according to claim 11 or 13, wherein said barrier is formed as a groove, in which an opening width of the groove is 1.5 to 2.5 mm, a bottom width thereof is 0.7 to 1.3 mm, and a depth thereof is 0.1 to 0.2 mm.

15. A method of manufacturing an optical disc according to claim 11 or 13, wherein said barrier is formed as a ridge, in which a bottom width of the ridge is 1.5 to 2.5 mm, a top width thereof is 0.7 to 1.3 mm, and a height thereof is 0.3 to 0.7 mm.

* * * * *